Patented Oct. 12, 1926.

1,603,174

UNITED STATES PATENT OFFICE.

JAMES W. WEIR, OF FILLMORE, CALIFORNIA.

PROCESS OF REFINING MINERAL LUBRICATING OILS.

No Drawing.   Application filed May 14, 1925. Serial No. 30,356.

This invention relates to the manufacture or refinement of mineral lubricating oil stocks.

In my copending application, Serial No. 545,538, method of manufacturing lubricating oils, filed March 21, 1922, patented December 8, 1925, Patent No. 1,564,501, there is described a process for refining lubricating oils in which the lubricating oil, after a sulphuric acid treatment and a removal of the major portion of the resultant sludge, is commingled with a comminuted solid absorbent material and heated to a temperature sufficient to decompose the sludge remaining in the oil so that such sludge is decomposed in the presence of the comminuted solid adsorbent material, breaking down into sulphur dioxide, passing off as a gas, and to material adsorbed by the comminuted solid adsorbent material so that in this manner the sludge remaining in the oil after an acid treatment can be removed from the oil stock. By such process it is not necessary to employ the water gathering process usually employed following a sulphuric acid treatment of lubricating oil stock nor a treatment of the stock with caustic soda to neutralize the oil. Moreover it is possible in a large number of cases through the use of such treatment with the comminuted solid adsorbent material to dispense with the filtration of the oil through a decolorizing agent.

It has been found, however, that when such process is employed for the treatment of certain lubricating oil stocks the lubricating oil stock subsequent to the treatment will change or darken in color, particularly if the oil has been subjected to relatively high acid treatment. This darkening of color in some cases may proceed to such an extent as to render the oil unfit for the market.

It is an object of the present invention to provide a process for the refining of lubricating oil stocks employing a comminuted solid adsorbent material by which process the darkening of the oil after treatment is prevented. I have discovered that if the lubricating oil stock subsequent to an acid treatment and the removal of the major portion of the resultant sludge is then treated with a quantity of comminuted solid adsorbent material below the temperature at which that portion of the sludge which is colloidally suspended in the oil will decompose, such comminuted solid adsorbent material will remove from the oil those materials which tend in the process of said copending application to darken the oil subsequent to the treatment described therein.

It appears that in the treatment of lubricating oil stocks with sulphuric acid, the resulting sludge formed acts in three ways. The major portion of the sludge readily settles from the oil and can be withdrawn or the oil readily decanted therefrom. Another portion of the sludge of the sulphuric acid reaction is colloidally suspended or dissolved in the treated oil stock. A third part of the produced sludge is suspended throughout the treated oil stock in the form of small particles, which refuse to separate out. The treatment of a lubricating oil stock containing "pepper" on solid suspended sludge with the comminuted solid adsorbent material at a temperature sufficient to decompose the sludge colloidally suspended in the stock, causes this "pepper" also to break down, liberating material which will not adhere to the comminuted solid unless excessive quantities of the same are used. The decomposition products of sludge "pepper" dissolve in the oil stock and later decompose and cause the oil to darken in color.

By a mixture of the acid treated oil stock with the comminuted solid adsorbent material at a temperature below the decomposing temperature of the colloidally suspended sludge, this finely divided, purely suspended sludge is gathered by the solid substance and can be readily separated from the oil stock on filtration or removal of the solid substance. Subsequently thereto the oil stock may be hot treated with further comminuted solid adsorbent material for the removal of the suspended sludge and the oil thus produced will be found to retain its color. The gathering of this finely divided, purely suspended sludge from the oil stock may be useful not only in a process in which the oil stock is to be neutralized or hot treated with further comminuted solid adsorbent material, but is advantageous where the oil stock is to be treated in any other customary or preferred manner such as by neutralization with the alkali or caustic soda.

Various other objects and advantages of the present invention will be apparent from the description of the preferred process or method of refining mineral or lubricating oil stocks, for which purpose an example of a process embodying the invention is hereafter fully set forth.

Mineral lubricating oil stock is first treated with sulphuric acid in any preferred or customary manner. For example sulphuric acid may be added to the oil stock and the admixture agitated by compressed air or in any other suitable way until the resultant reaction is substantially complete. The quantity and strength of acid employed depends upon the character of oil and the extent of acid treatment to be desired, the effects of different quantities of acid and different strengths of acid being well understood in the art and varying somewhat with the individual choice of different refiners. After the completion of the reaction the oil is permitted to stand until the major portion of the produced acid sludge separates from the oil stock and such acid sludge is then withdrawn. If desired the oil may be treated with a further application of sulphuric acid in the same manner and again followed by a removal of the major portion of acid sludge. In the case of lubricating oil stocks containing waxes it is necessary at times to treat at somewhat elevated temperatures in order that the stock treated will be fluid. It is also understood that inasmuch as waxes that are extracted from petroleum or mineral oil are often treated after extraction from the oil as well as treated while they still remain in the petroleum oil or lubricating oil stock, and that the method of treating lubricating oil stock are adapted either to the treatment or refinement of waxes, that the specification and claims herein apply equally to the treatment of waxes extracted from petroleum as well as lubricating oil stocks and distillates.

Subsequent to the treatment of the lubricating oil stock with sulphuric acid to the desired extent and the removal of that portion of the resultant acid sludge that settles therefrom, the lubricating oil stock is then treated with a quantity of comminuted solid adsorbent material, there being a large number of materials suitable for this purpose. Thus comminuted granite, magnesium silicate, fuller's earth, diatomaceous earth, decolorizing agents made by acid treating montmorillonite and like clay materials, certain minerals of the talc or serpentine group which may or may not have decolorizing properties, and other insoluble solid substances which may or may not have decoloring properties, are suitable comminuted solid adsorbent materials for the process. An important feature of the invention is the utilization of an adsorbent material in this stage of the process which is not in the spent condition but is fresh in the sense that its pores are substantially free from tar or acid reaction bodies and, therefore, adapted to efficiently operate upon the oil. The amount of such material which should be added to the lubricating oil stock will of course vary with the character of lubricating oil stock and the character of acid treatment the same has been subjected to. Normally about 1 ton of such solid substance to about 30,000 gallons of oil is satisfactory. This comminuted solid adsorbent material is then agitated with the lubricating oil stock until the solid suspended sludge in the stock is gathered by the adsorbent material, and will separate from the oil stock. The agitation may be carried on at various temperatures, generally the oil following the acid treatment being at a suitable temperature for this step of the process, it being preferred, however, that the temperature should be below that point at which the acid sludge colloidally suspended or dissolved in the oil is decomposed. The comminuted solid and the sludge content thus adsorbed from the oil may be separated from the oil stock in any preferred manner such as by filtration or settling followed by decantation.

Subsequent to this gathering of the solid suspended sludge by a comminuted solid, the oil stock may be finished in any desired or customary manner. It is preferred, however, that the oil stock be finished in the following manner.

The oil stock is then transferred to a suitable treating or mixing apparatus equipped with a mechanical agitator and with a means for heating the material therein. A suitable quantity of finely divided or comminuted solid adsorbent material is then added to the oil. This material may be similar to that employed in the previous step of the process. The quantity of material added will of course vary widely. Normally 1 ton of the adsorbent material to 5000 gallons of the lubricating stock under treatment being satisfactory. After the addition of such comminuted solid the admixture is raised in temperature to a temperature sufficient to cause the sludge remaining in the oil to decompose in the presence of the comminuted solid. The temperature is preferably between 180° F. and a temperature below the vaporizing point of the stock, 250° F. being usually the preferable temperature to employ. The admixture is thoroughly agitated during this heating process. The high temperature to which the admixture is heated causes the sludge present to decompose, liberating sulphur dioxide which passes out as a gas from the admixture and an unsaturated material is liberated which when liberated from the sludge in the presence of the comminuted solid adheres thereto and does not dissolve back into the lubricating oil stock and darken the color of the same. This step of the process may, if desired, be facilitated by blowing gas through the admixture, preferably an inert gas such as carbon dioxide being utilized.

Subsequent to the treatment the adsorbent material with the matter adsorbed therein may be separated from the lubricating oil stock in any desired manner. I prefer, however, to accomplish the separation through the use of a filter press such as the well known "Kelly", and "Sweetland". The lubricating oil stock subsequent to filtration may then be "brightened" or freed from water in the usual manner. Generally it is desired to reduce the temperature of the lubricating oil stock subsequent to the last treatment with the comminuted adsorbent material by passing the stock through a cooler. It is not necessary that extraordinary measures or apparatus be used to quickly heat and quickly cool the oil, as the oil may be maintained at the high temperature for substantial periods of time without materially injuring the quality thereof.

After the oil has been "brightened" it may, if desired, be passed through a filter bed or strainer of any finely divided solid substance to remove the last traces of a solid matter from the stock or in some cases, the last traces of solid material may be removed from the oil before or after the "brightening" process by the use of a centrifuge machine.

The removal of the sludge from the lubricating oil stock by the method of this invention is effected without employment of chemicals which may have injurious effects or form injurious compounds in the lubricating oil stock and hence is superior to the ordinary removal of such sludge by treatment with chemical neutralizing agents.

When the method herein described is employed upon lubricating oil stocks containing naphthenic or other organic acids which are objectionable in the finished lubricating oils, these acids either being in and coming from the crude oil from which the stock originated or formed in the distillation or refining processes used in their production, it will be found that they are not always removed and may remain in the finished lubricating oil produced. These acids may be removed and be prevented from forming in the distillation process, or substantially removed after the distillation process and before acid treatment in various ways as follows:

1. By distilling the oil for the separation of the lubricating oil stock in the presence of caustic or other alkaline substances.
2. By treating the stock with caustic soda or other alkaline substances before acid treatment.
3. By treating the oil with an alcohol wash after the alkaline treatment and before the acid treatment.
4. By treating the oil with an alcoholic caustic wash before the acid treatment.
5. By treating the oil with an alcohol wash before the acid treatment.

Also, the organic acids may be removed after the hot clay treatment by
6. Treating the oil with an alkaline wash alone.
7. Treating the oil with an alkaline wash followed by an alcoholic wash to remove the resultant produced soaps.
8. Treating the oil with an alcoholic caustic soda solution.
9. Treating the oil with alcohol wash.

The step of removing or these methods of removing organic acids are not claimed per se but when applied to the removal of organic matter from the oil stock treated with a comminuted solid adsorbent material, accomplish results in a definite way otherwise not obtained.

While the method of treating or refining lubricating oil stocks herein described is well adapted to accomplish the purposes of this invention, various modifications may be made in the details of the process without departing from the spirit of the invention and the invention is therefore not limited to the specific process described for the purpose of illustrating the invention, but includes all such modifications as come within the scope of the appended claims.

I claim:

1. A method of refining lubricating oil stocks which comprises treating the oil with sulphuric acid, settling and removing the major portion of the sludge, then agitating the oil stock with a fresh comminuted solid adsorbent material at a temperature below that at which the sludge decomposes to gather the solid suspended sludge, separating the adsorbing material with the matters adsorbed thereon from the oil stock, then adding a comminuted solid adsorbent material to the oil stock, heating the mixture to a temperature sufficient to decompose the remaining sludge and liberate sulphur dioxide therefrom, and separating the adsorbent material with the matters adsorbed thereon from the oil stock.

2. A method of refining lubricating oil stocks which comprises treating the oil with sulphuric acid, settling and removing the major portion of the sludge, then agitating the oil stock with a fresh comminuted solid adsorbent material at a temperature below that at which the sludge decomposes to gather the solid suspended sludge, separating the adsorbing material with the matters adsorbed thereon from the oil stock, then adding a comminuted solid adsorbent material to the oil stock, heating the mixture to a temperature above 180° F. to decompose the remaining sludge and liberate sulphur dioxide therefrom, and separating the adsorbent material with the matters adsorbed thereon from the oil stock.

3. A method of refining lubricating oil stocks which comprises treating the oil with sulphuric acid, settling and removing the major portion of the sludge, then agitating the oil stock with a fresh comminuted solid adsorbent material at a temperature below that at which the sludge decomposes to gather the solid suspended sludge, separating the adsorbing material with the matters adsorbed thereon from the oil stock, then adding a comminuted solid adsorbent material to the oil stock, heating the mixture to a temperature sufficient to decompose the remaining sludge and liberate sulphur dioxide therefrom, and separating the adsorbent material with the matters adsorbed thereon from the oil stock, blowing the mixture with a non-oxidizing gas during said heating.

4. A method of refining lubricating oil stocks which comprises treating the oil with sulphuric acid, settling and removing the major portion of the sludge, then agitating the oil stock with a fresh comminuted solid adsorbent material at a temperature below that at which the sludge decomposes to gather the solid suspended sludge, separating the adsorbing material with the matters adsorbed thereon from the oil stock, then adding the comminuted solid adsorbent material to the oil stock, heating the mixture to a temperature above 180° F. to decompose the remaining sludge and liberate sulphur dioxide therefrom, and separating the adsorbent material with the matters adsorbed thereon from the oil stock, blowing the mixture with a non-oxidizing gas during said heating.

Signed at Los Angeles, California, this 4th day of April, 1925.

JAMES W. WEIR.